United States Patent [19]

McDonald et al.

[11] Patent Number: 4,973,132
[45] Date of Patent: Nov. 27, 1990

[54] POLARIZED HOLOGRAPHIC HEADS UP DISPLAY

[75] Inventors: Mark E. McDonald, Playa del Rey; Ronald T. Smith, Torrance, both of Calif.

[73] Assignee: Hughes Aircraft Company, Los Angeles, Calif.

[21] Appl. No.: 428,094

[22] Filed: Oct. 27, 1989

[51] Int. Cl.$^5$ ............................................. G02B 27/14
[52] U.S. Cl. ..................................... 350/174; 350/3.7; 350/169
[58] Field of Search ....................... 350/3.7, 3.72, 169, 350/171, 172, 174, 394, 395, 399; 340/705

[56] References Cited

U.S. PATENT DOCUMENTS

| | | | |
|---|---|---|---|
| 2,750,833 | 6/1956 | Gross | 350/174 |
| 3,622,220 | 11/1971 | Kogelnick | 350/394 |
| 3,949,490 | 4/1976 | Derderian et al. | 350/3.72 |
| 4,763,990 | 8/1988 | Wood | 350/3.72 |
| 4,790,613 | 12/1988 | Moss | 350/174 |
| 4,808,978 | 2/1989 | Vernay | 350/399 |
| 4,859,031 | 8/1989 | Berman et al. | 350/172 |

Primary Examiner—Bruce Y. Arnold
Assistant Examiner—Jay Ryan
Attorney, Agent, or Firm—Leonard A. Alkov; Wanda K. Denson-Low

[57] ABSTRACT

A head-up vehicle instrument display system that includes an imaging illumination source located in a recess in the vehicle dashboard or on the dashboard, and a combiner/retarder element embedded in a vehicle windshield. The combiner/retarder element includes a reflection hologram and one or more half-wave retarders, and optionally the inside surface of the vehicle windshield.

15 Claims, 3 Drawing Sheets

POLARIZED HOLOGRAPHIC HEADS UP DISPLAY

BACKGROUND OF THE INVENTION

The disclosed invention is directed generally to head-up displays for vehicles, and more particularly is directed to a holographic head-up display which provides for increased reflectivity and image contrast.

Head-up displays are utilized in vehicles such as automobiles to produce virtual images of vehicle operating parameter indicators that appear to be ahead of the vehicle windshield and are therefore viewable by the vehicle operator without diversion of his or her eyes to an instrument panel inside the vehicle and without refocusing.

A known head-up display technique involves utilizing a reflection hologram supported by a vehicle windshield for producing a virtual image in the line of sight of the operator of the vehicle. The hologram can be a mirror hologram for providing the virtual image of an image source, or it can be an image hologram which produces a virtual image recreation of the recorded image in response to playback illumination. Due to various factors such as playback illumination angle and illumination source optical characteristics, the virtual images produced by holographic head-up displays might not have sufficient contrast or might not be sufficiently bright due to insufficient reflectivity of the hologram.

SUMMARY OF THE INVENTION

It would therefore be an advantage to provide a head-up display for vehicles which provides for increased image contrast.

Another advantage would be to provide a head-up display for vehicles which provides for increased reflectivity of the imaging illumination.

The foregoing and other advantages are provided by the invention in a head-up display which includes a reflection hologram embedded in a vehicle windshield and an imaging illumination source for directing P-polarized illumination to the windshield at an angle which is selected to enhance the transmission of P-polarized light. A half-wave retarder is embedded in the windshield between the hologram and the inside air interface for rotating the polarization of the P-polarized light transmitted by the inside windshield/air interface to provide S-polarized imaging illumination to the reflection hologram which functions more efficiently with S-polarized illumination.

In a further embodiment of the invention, the inside windshield/air interface and the hologram function as joint combiners, and the imaging illumination is randomly polarized. The polarization of the primarily P-polarized imaging illumination transmitted by the inside windshield/air interface is rotated by the half-wave retarder to provide S-polarized imaging illumination to the reflection hologram.

In yet another embodiment of the invention, the inside windshield/air interface and the hologram function as joint combiners, and the half-wave retarder is located between the reflection hologram and the outside windshield/air interface so that it receives imaging illumination transmitted by the hologram. The imaging illumination directed to the inside windshield/air interface is S-polarized so that most of it is reflected at the inside windshield/air interface and at the hologram. The half-wave retarder rotates the polarization of the imaging illumination transmitted by the hologram so that the imaging illumination incident on the outside windshield/air interface is primarily P-polarized, most of which is transmitted and not reflected back.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
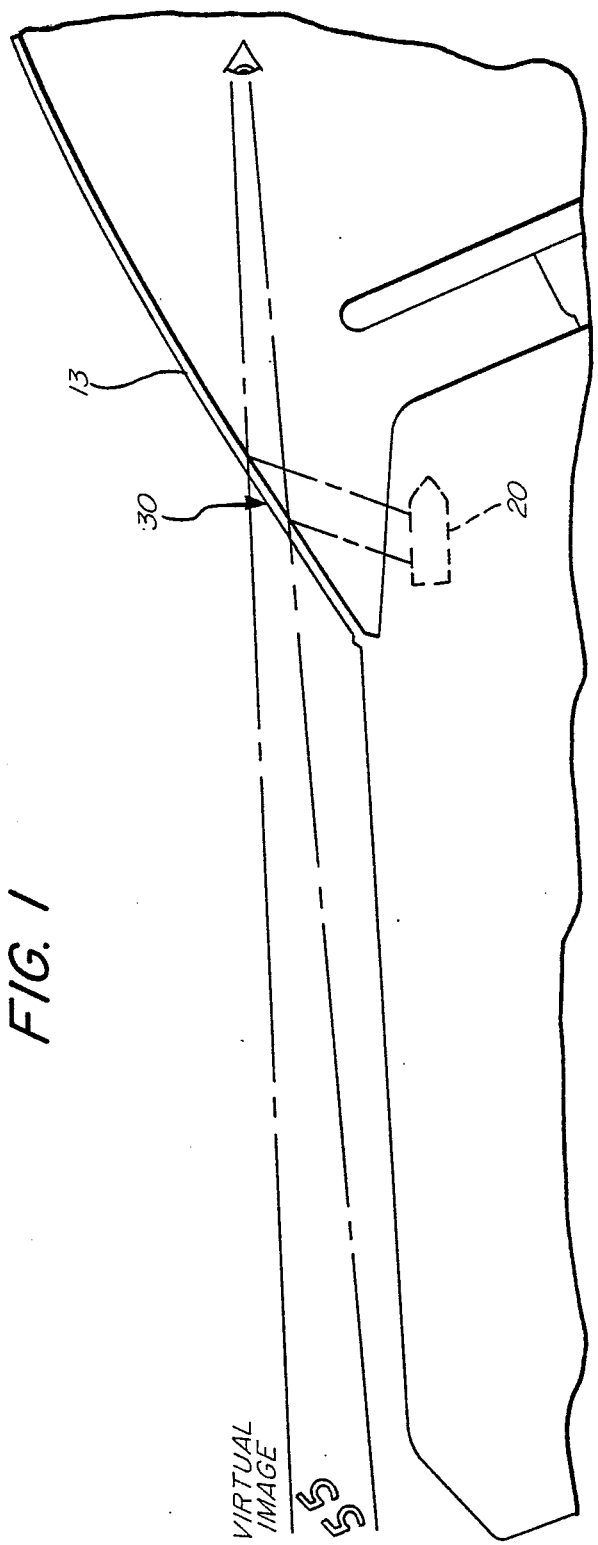
FIG. 1 is a schematic illustration of the major components of the disclosed vehicle head-up display system.

In the following detailed description and in the several figures of the drawing, like elements are identified with like reference numerals.

Referring now to FIG. 1, shown therein is a head-up vehicle instrument display system that includes an imaging illumination source 20 located in a recess in the vehicle dashboard or on the dashboard, a combiner/retarder element 30 that includes a reflection hologram, one or more half-wave retarders, and optionally the inside surface of a vehicle windshield 13.

Specific embodiments of the combiner-retarder elements 30 will be discussed in detail further herein. Briefly, the reflection hologram functions as a beamsplitter combiner for partially reflecting the imaging illumination toward the vehicle operator so as to produce a virtual image. If the inside windshield surface is also utilized as a beamsplitter combiner, it functions as a joint combiner with the hologram. The one or more halfwave retarders generally function to rotate the polarization of the imaging illumination passing therethrough to (a) provide S-polarized playback imaging illumination to the hologram which operates more efficiently with playback illumination of such polarization, and/or (b) reduce ghost image producing reflections at the outside windshield/air interface.

The reflection hologram of the combiner/retarder element can be an image reflection hologram which produces a virtual image of the image stored therein, or it can be a mirror hologram which produces a virtual image of the image source contained in the imaging illumination source 20.

The imaging illumination source 20 provides P-polarized light, S-polarized light, or randomly polarized light, depending on the configuration of the combiner/retarder element 30. The incidence angle of the imaging illumination directed to the windshield is preferably sufficiently close to the Brewster's angle for the material comprising the windshield to provide appropriate reflectivity or transmission of the imaging illumination at the inside windshield surface by controlling the polarization of the imaging illumination. At the Brewster's angle, 100% of the P-polarized component of incident light passes through the incident windshield/air interface without reflection, while the S-polarized component is partially reflected at such an interface. For the specific example of a glass windshield, the Brewster's angle is 56.5 degrees relative to normal.

In accordance with the invention, the incidence angle of the imaging illumination can be within a relatively large range, for example in the range of about 47 to 72 degrees relative to normal for glass windshields, depending on the required contrast. Thus, the invention does not impose significant limitations on the design of the windshield and dashboard.

Figure 2:
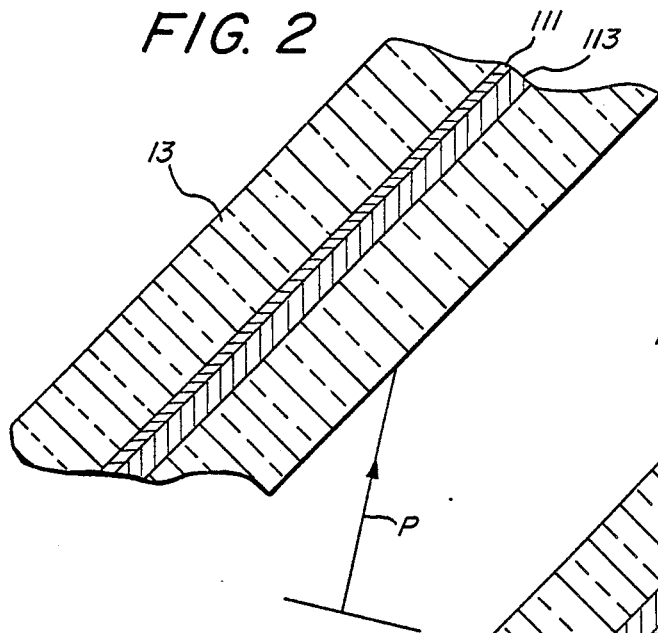
FIG. 2 is a schematic sectional view of and illustrative example of the combiner and polarization rotating elements the head-up display system of FIG. 1.

Referring now to FIG. 2, shown therein is an illustrative example of a combiner/retarder element of the virtual image display system of FIG. 1 utilizes only a reflection hologram 111 as a beamsplitter combiner. The reflection hologram 111 is embedded in the windshield 13, as is a half-wave retarder 113 which is between the reflection hologram 111 and the inside windshield/air interface. By way of specific example, the reflection hologram 111 and the half-wave retarder 113 can be laminated between the layers or singlets of a standard safety windshield.

With the combiner/retarder of FIG. 2, the imaging illumination source 20 is configured to provide P-polarized imaging illumination, most of which will be transmitted since the incidence angle is appropriately close to the Brewster's angle. The polarization of the transmitted P-polarized illumination incident on the half-wave retarder 113 is rotated so that S-polarized imaging illumination is provided to the reflection hologram 111, which operates more efficiently with S-polarized imaging illumination. The S-polarized imaging illumination reflected by the hologram 111 is rotated back to P-polarized illumination that is nearly fully transmitted through the inside windshield/air interface to produce the virtual image.

By way of illustrative example, the half-wave retarder 113 should be zero-order for broad band imaging illumination, and can be multi-order for narrow band imaging illumination. The peak of the half-wave retardance at the particular incidence angle should be centered at about the peak wavelength of the imaging illumination.

With the combiner/retarder element of FIG. 2 and the P-polarized imaging illumination from the imaging illumination source 20, high contrast is achieved while ghost image intensity is kept low since reflectivity at the inside windshield/air interface is low due to the P-polarized imaging illumination provided by the imaging illumination source 20, and since the imaging illumination reflected back from the outside windshield/air interface is attenuated by the hologram and the inside windshield surface.

It is pointed out that as a result of the polarization exchange caused by the combiner/retarder elements of FIG. 2, polarized sunglasses will cause a scene to have different appearance when viewed through the half-wave retarder than when viewed through the remainder of the windshield. Polarized sunglasses are typically configured to absorb polarized off-axis specular reflections, commonly perceived as glare, from sources that tilt vertically (i.e., horizontally oriented sources such as a road surface). The result is a reduction in the perceived glare from sources that tilt vertically. However, the half-wave retarder exchanges polarizations, and a scene viewed through the half-wave retarder with polarized sunglasses results in the reduction of perceived glare from horizontally tilted sources (e.g., vertically oriented glass surfaces on an office building), which is essentially a rotation of the reduction of perceived glare of a scene viewed through the windshield portion without the half-wave retarder.

Figure 3:
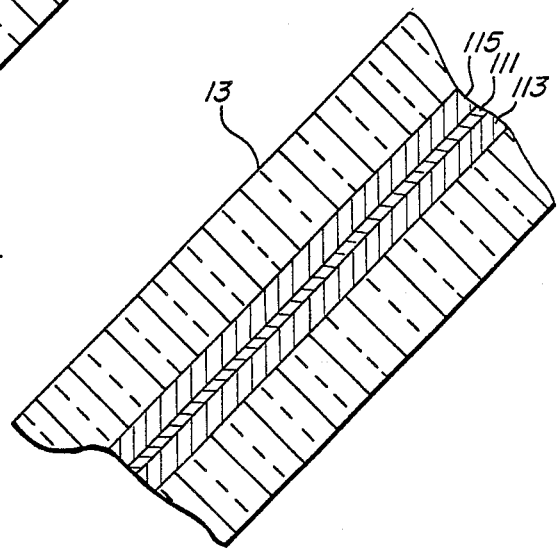
FIG. 3 is a schematic sectional view of a further illustrative example of the combiner and polarization rotating elements the head-up display system of FIG. 1.

This difference can be compensated by utilizing a second half-wave retarder 115 between the reflection hologram 111 and the outside windshield/air interface, as shown in FIG. 3.

Figure 4:
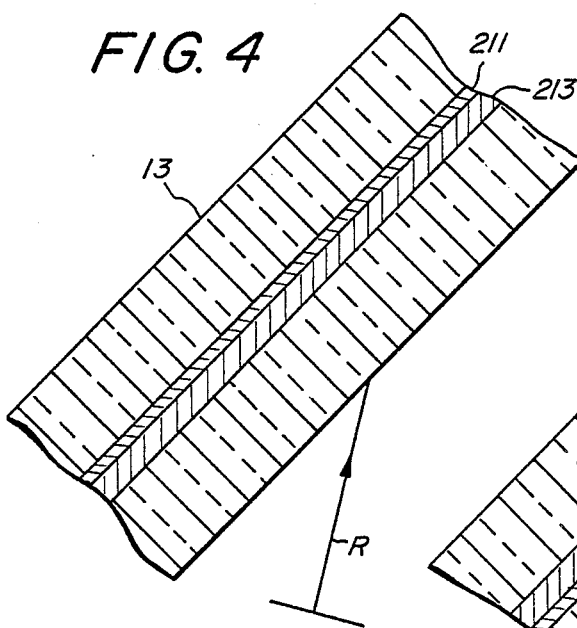
FIG. 4 is a schematic sectional view of another illustrative example of the combiner and polarization rotating elements the head-up display system of FIG. 1.

Referring now to FIG. 4, shown therein is a combiner/retarder element which is similar to that of FIG. 2, with the difference being (a) the use of a joint combiner that includes a reflection hologram 211 and a beamsplitter region of the inside windshield/air interface adjacent the hologram 211, and (b) the use of randomly polarized imaging illumination. Since the incidence angle on the windshield is appropriately appropriately close to the Brewster's angle, some of the S-polarized component of the imaging illumination will be reflected at inside windshield/air interface, while most of the P-polarized component will be transmitted. A half-wave retarder 213 rotates the polarization of the imaging illumination that passes through so as to provide to the hologram 211 imaging illumination that is primarily S-polarized. The hologram 211, which operates more efficiently with S-polarized light, provides reflected S-polarized illumination which has its polarization rotated by the half-wave retarder 213 so that P-polarized light is incident at the inside windshield/air interface and is mostly transmitted to form the virtual image together with the illumination reflected by the inside windshield/air interface.

By way of illustrative example, the hologram 211 and the half-wave retarder 213 are laminated between the layers or singlets of a windshield, which produces reflected images from the hologram and the windshield beamsplitter region that are acceptably aligned.

The combiner/retarder structure of FIG. 4 has less contrast than the structure of FIG. 2, but advantageously utilizes randomly polarized light. The ghost images due to imaging illumination reflected back by the outside windshield/air interface will be of relatively low intensity due to attenuation by the hologram and the inside windshield/air interface upon return to the inside of the vehicle.

As with the structure of FIG. 2, polarized sunglasses will cause the half-wave retarder region of the structure of FIG. 4 to have a different appearance from the rest of the windshield. This can be compensated by the addition of a second half-wave retarder between the reflection hologram 211 and the outside windshield/air interface, in manner similar to that shown and discussed relative to FIG. 3.

Figure 5:
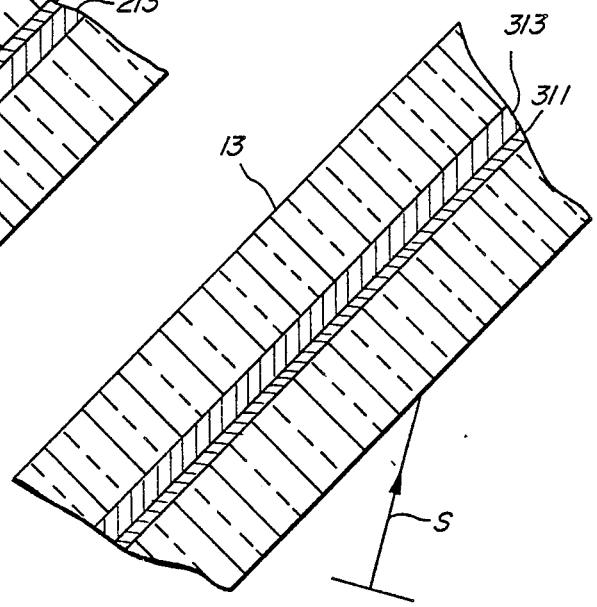
FIG. 5 is a schematic sectional view of still another illustrative example of the combiner and polarization rotating elements the head-up display system of FIG. 1.

Referring now to FIG. 5, shown therein a combiner/retarder element which utilizes the inside windshield/air interface and a reflection hologram 311 as a joint combiner for partially reflecting S-polarized imaging illumination. The reflection hologram 311 is adjacent the inside windshield/air interface and a half-wave retarder 313 is located between the reflection hologram 311 and the outside windshield/air interface.

In operation, most of the S-polarized light is reflected by the inside windshield/air interface. Most of the S- polarized light transmitted by such interface is reflected by the hologram 311, and the portion thereof that passes through the inside windshield/air interface produces the virtual image together with the S-polarized imaging illumination reflected by the inside windshield/air interface.

The polarization of the light transmitted by the hologram 311 toward the outside windshield/air interface is rotated by the half-wave retarder 313, and therefore the imaging illumination that reaches the outside windshield/air interface is predominately P-polarized, and mostly transmitted.

By way of illustrative example, the hologram 311 and the half-wave retarder 313 are laminated between the layers or singlets of a windshield, which produces reflected images from the hologram and the windshield beamsplitter region that are acceptably aligned.

The combiner/retarder structure of FIG. 5 is advantageously utilized in applications where the efficiency of the reflection hologram is limited (for example, as a trade-off for minimizing see-through coloration). Unused S-polarized light is rotated to P-polarized light so that it can easily pass through the outside windshield/air interface.

With the foregoing combiner/retarder elements, increased brightness and/or increased contrast are achieved individually or in combination by increasing the amount of reflected illumination by controlling incidence angle and/or the polarization of the imaging illumination incident on the inside windshield/air surface and the reflection hologram.

Figure 6:
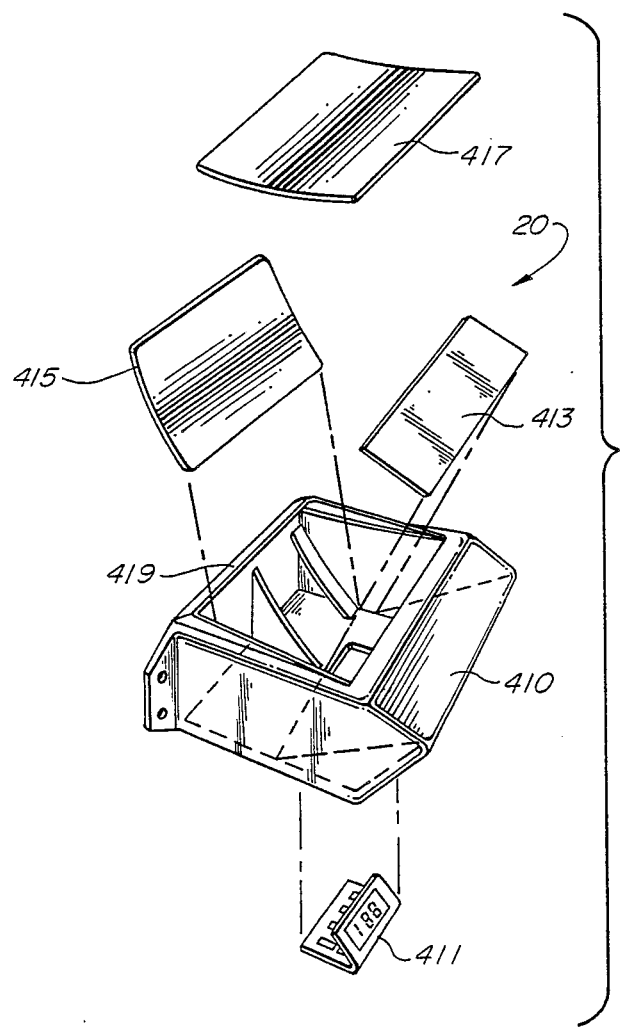
FIG. 6 is a schematic exploded view of the imaging illumination source of the head-up display system of FIG. 1.

Referring now to FIG. 6, shown therein is a detail view of the imaging illumination source 20 which includes an image source 411 comprising, for example, a segmented or matrix addressable liquid crystal display (LCD) which is configured to provide the appropriate polarization. LCD's are readily available devices and can be obtained from Seiko of Japan, for example. Also, a spectrally narrow source such as light emitting diodes available from Stanley could be utilized with an appropriate polarizer for the LED outputs. As still another alternative, the image source can comprise a high intensity vacuum fluorescent display (VFD) with an appropriate polarizer. VFD's are known display devices which are commercially available, for example, from Futaba Corporation of America, Plymouth, Mich., and commonly include segmented elements that are selectively energizable to form light emitting numerical and/or alphabetical symbols, as well as other indicia.

Inputs to the image source 411 are provided by appropriate transducing circuitry to display selected vehicle and/or engine operating parameters and conditions.

A planar fold mirror 413 secured in the housing 410 relays the imaging illumination from the image source 411 to an off-axis, aspheric mirror 415, also secured in the housing 410, which in turn relays the imaging illumination through a transparent cover 417 to the combiner/element 30. While a relay mirror is included, it should be appreciated that depending on the location of the image source 411 in the imaging illumination source 20 and the location of the imaging illumination source 20 relative to the windshield, the relay mirror might not be necessary. It should also be appreciated that with an odd number of reflecting elements (e.g., three), the image source 411 must adapted to be a mirror image of the intended virtual image. With an even number of reflecting elements (e.g., two), the image source 411 would be adapted to be oriented the same as the intended virtual image.

The aspheric mirror 415 is generally concave and magnifies the image relayed to the combiner/retarder element 30, and further functions to locate the virtual image relatively far ahead of the observer. The particular curvatures of the aspheric mirror can be defined so as to compensate for the distortion introduced by the off-axis configuration of the aspheric mirror and the distortion introduced by the curvatures of the windshield.

While an aspheric mirror 415 is included in the foregoing illustrative example, a flat mirror could be utilized if it is not necessary to locate the virtual image relatively far ahead of the observer. It should also be realized that the mirrors 413 and 415 could be eliminated by directing the image source directly at the combiner/retarder element 30.

The foregoing has been a disclosure of a vehicle instrument head-up display that advantageously provides for increased image contrast or increased reflectivity, while maintaining ghost image intensity below objectionable levels, and allows the use of less expensive lights sources.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle, comprising:
   a substantially transparent substrate having first and second opposing air interfaces;
   a combiner reflection hologram embedded within said substantially transparent substrate between said first and second opposing air interfaces for producing a primary virtual image viewable by the operator of the vehicle;
   image source means for directing imaging illumination for said hologram to said first air interface at an angle which enhances reflection of a first predetermined linear polarization and transmission of a second linear polarization, said imaging illumination being randomly polarized or of a predetermined linear polarization, depending on whether said first air interface is selected to function as a joint combiner with said reflection hologram; and
   means embedded in said substrate for rotating the linear polarization of imaging illumination transmitted therethrough, said rotating means and the polarization or non-polarization of said imaging illumination being adapted to provide to said hologram imaging illumination which for the linear polarization is most efficient and to reduce reflection of imaging illumination at said second air interface.

2. The head-up display of claim 1 wherein (a) said first interface is not utilized as a combiner element, (b) said rotating means is located between said reflection hologram and said first air interface, and (c) said image source means provides P-polarized imaging illumination.

3. The head-up display of claim 2 wherein said rotating means includes a half-wave retarder.

4. The head-up display of claim 3 further including another half-wave retarder located between said reflection hologram and said second air interface.

5. The head-up display of claim 1 wherein (a) said first interface is utilized as a combiner element, (b) said rotating means is located between said reflection hologram and said first air interface, and (c) said image source means provides randomly polarized illumination.

6. The head-up display of claim 5 wherein said rotating means includes a half-wave retarder.

7. The head-up display of claim 6 further including another half-wave retarder located between said reflection hologram and said second air interface.

8. The head-up display of claim 1 wherein (a) said first interface is utilized as a combiner element, (b) said rotating means is located between said reflection hologram and said second air interface, and (c) said image source means provides S-polarized illumination.

9. The head-up display of claim 8 wherein said rotating means includes a half-wave retarder.

10. A head-up display for a vehicle, comprising:
a substantially transparent substrate having first and second opposing air interfaces;
a combiner reflection hologram embedded within said substantially transparent substrate between said first and second opposing air interfaces for producing a primary virtual image viewable by the operator of the vehicle;
image source means for directing linearly polarized imaging illumination for said hologram to said first air interface of said beam splitter at an angle which enhances reflection of a first predetermined linear polarization and transmission of a second linear polarization, said imaging illumination being of said second linear polarization; and
means embedded in said substrate between said first air interface and said reflection hologram for rotating the linear polarization of imaging illumination transmitted therethrough to said hologram.

11. A head-up display for a vehicle, comprising:
a substantially transparent substrate having first and second opposing air interfaces wherein said first interface functions as a combiner;
a combiner reflection hologram embedded within said substantially transparent substrate between said first and second opposing air interfaces and cooperating with said first air interface for producing a primary virtual image viewable by the operator of the vehicle;
image source means for directing randomly polarized imaging illumination to said first air interface of said substrate at an angle which enhances reflection of a first predetermined linear polarization and transmission of a second linear polarization; and
means embedded in said substrate between said first air interface and said reflection hologram for rotating the linear polarization of imaging illumination transmitted therethrough to said hologram, whereby the imaging illumination incident on said reflection hologram is primarily of said first predetermined linear polarization as a result of the imaging illumination transmitted by said first air interface and said rotating means.

12. A head-up display for a vehicle, comprising:
a substantially transparent substrate having first and second opposing air interfaces wherein said first interface functions as a combiner;
a combiner reflection hologram embedded within said substantially transparent substrate between said first and second opposing air interfaces and cooperating with said first air interface for producing a primary virtual image viewable by the operator of the vehicle;
image source means for directing linearly polarized imaging illumination to said first air interface of said substrate at an angle which enhances reflection of a first linear polarization and transmission of a second linear polarization, said imaging illumination being of said first linear polarization; and
means embedded in said substrate between said reflection hologram and said second air interface for rotating the linear polarization of imaging illumination transmitted therethrough, whereby the imaging illumination incident on said second air interface is primarily of said second linear polarization.

13. A head-up display for a vehicle, comprising:
a substantially transparent substrate having first and second opposing air interfaces;
an image reflection hologram embedded within said substantially transparent substrate between said first and second opposing air interfaces for producing a primary virtual image viewable by the operator of the vehicle in response to imaging illumination;
illumination means for directing P-polarized illumination to said first air interface of said substrate at an angle which enhances transmission of P-polarized illumination; and
polarization rotating means embedded in said substrate between said first air interface and said image reflection hologram for rotating the linear polarization of the imaging illumination transmitted to said hologram, whereby the imaging illumination incident on said image reflection hologram is S-polarized.

14. The head-up display of claim 13 wherein said polarization rotating means comprises a half-wave retarder.

15. The head-up display of claim 14 further including a further half-wave retarder embedded in said substrate between said image reflection hologram and said second air interface.

* * * * *